United States Patent [19]

Takahashi

[11] Patent Number: 4,958,288
[45] Date of Patent: Sep. 18, 1990

[54] SYSTEM AND METHOD FOR AUTOMATICALLY CONTROLLING A VEHICLE SPEED TO A DESIRED CRUISING SPEED

[75] Inventor: Hiroshi Takahashi, Komae, Japan

[73] Assignee: Nissan Motor Company, Limited, Yokohama, Japan

[21] Appl. No.: 213,927

[22] Filed: Jun. 30, 1988

[30] Foreign Application Priority Data

Jul. 1, 1987 [JP] Japan .................. 62-162221

[51] Int. Cl.$^5$ ............................................. B60K 31/00
[52] U.S. Cl. ................................. 364/426.04; 180/179; 123/352
[58] Field of Search ...................... 364/426.04, 431.07; 123/352; 180/170, 176, 179

[56] References Cited

U.S. PATENT DOCUMENTS

| | | | |
|---|---|---|---|
| 4,560,024 | 12/1985 | Noda et al. | 123/352 |
| 4,591,986 | 5/1986 | Nakajima et al. | 364/426.04 |
| 4,598,370 | 7/1986 | Nakajima et al. | 364/426.04 |
| 4,723,213 | 2/1988 | Kawata et al. | 180/179 |
| 4,725,969 | 2/1988 | Onogi et al. | 364/431.07 |
| 4,809,175 | 2/1989 | Hosaka et al. | 180/170 |
| 4,829,437 | 5/1989 | Suzuki et al. | 364/426.04 |
| 4,835,696 | 5/1989 | Suzuki et al. | 364/426.04 |

FOREIGN PATENT DOCUMENTS 0256786  2/1988  European Pat. Off. .
3416812  11/1985  Fed. Rep. of Germany .
60-4428  10/1985  Japan .

OTHER PUBLICATIONS

IEEE Spectrum, Aug. 1984 cover page and pp. 26–32.

Primary Examiner—Gary Chin
Attorney, Agent, or Firm—Foley & Lardner, Schwartz, Jeffery, Schwaab, Mack, Blumenthal & Evans

[57] ABSTRACT

A system for automatically controlling a vehicle speed to a desired cruising speed and method therefor are disclosed in which a controlled variable for an actuator for actuating a vehicular engine output to run the vehicle at the desired cruising speed is set using input and output membership functions for deriving an optimum operating variable of the actuator in a fuzzy estimation on the basis of input information on vehicle speed and a target cruising speed, the membership functions being stored in a memory and being correctable on the basis of the input information on the vehicle speed, change rates (control deviation, first-order difference, and second-order difference) of the vehicle speed, and set controlled variable, so that the vehicle speed conincides with the target cruising speed without reduction of control accuracy and without occurrence of overshooting of the controlled variable.

21 Claims, 11 Drawing Sheets

INPUT MEMBERSHIP FUNCTION

OUTPUT MEMBERSHIP FUNCTION

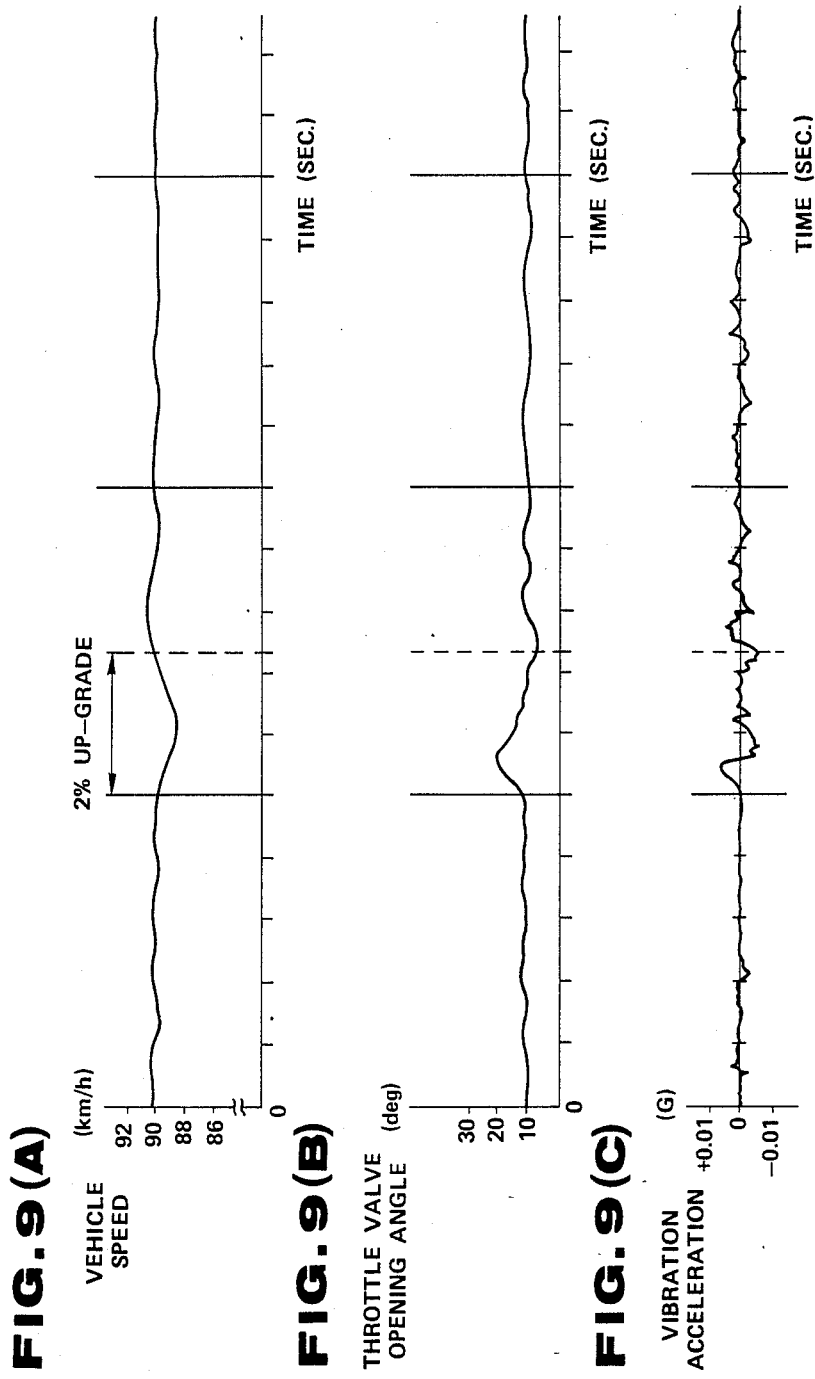

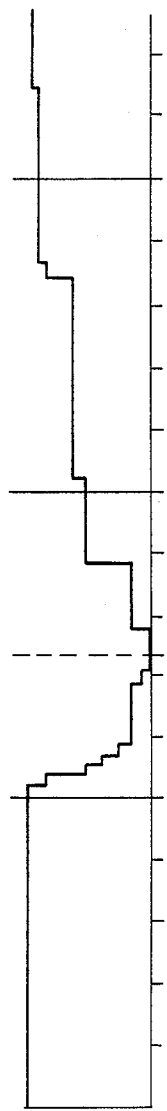
FIG. 9(D) PARAMETER AXi
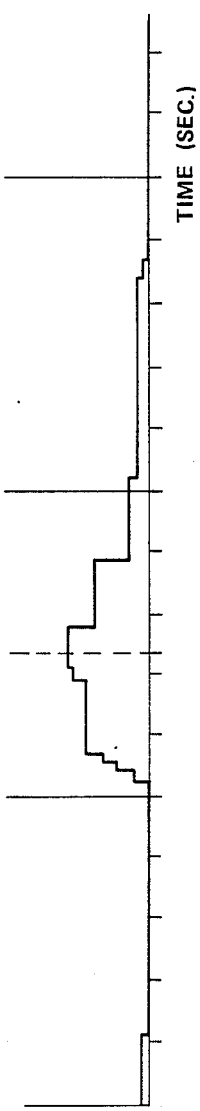
FIG. 9(E) PARAMETER BXi
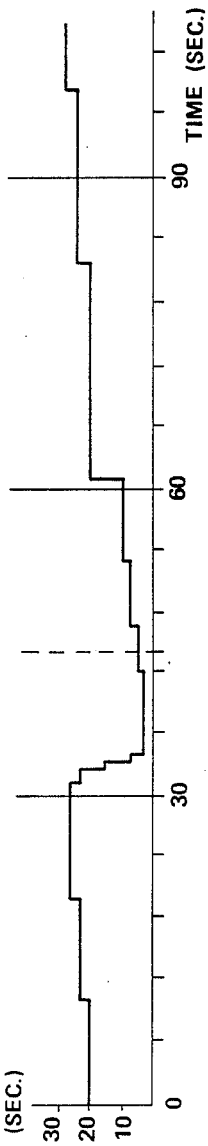
FIG. 9(F) ADJUSTMENT PERIOD τ

SYSTEM AND METHOD FOR AUTOMATICALLY CONTROLLING A VEHICLE SPEED TO A DESIRED CRUISING SPEED

BACKGROUND OF THE INVENTION (1) Field of the invention

The present invention relates generally to a system and method for automatically controlling a vehicle's speed to a desired cruising speed using a fuzzy estimation.

(2) Background of the art

A Japanese Patent Application First Publication (Tokkai) sho No. 60-4428 published on Jan. 10, 1985 and Japanese Utility Model Application First Publication (Zikkai) sho No. 61-39636 published on Mar. 13, 1986 exemplify systems for automatically controlling vehicle speeds to desired cruising speeds in which a vehicle speed is detected by means of a vehicle speed sensor, the detected vehicle speed is compared with a target vehicle speed set on the basis of a driver's decision, deviations as the result of comparison (a control deviation, first-order difference and second-order difference) are calculated, a controlled variable is set by substituting the values of deviations into a control calculation equation, an actuator for an engine throttle valve is activated on the basis of the result of calculation equation to adjust an opening angle of an engine throttle valve, so that the vehicular engine output is adjusted to cruise the vehicle at the desired target speed.

In addition, the vehicle speed is once stored into a memory at a time when the set cruising speed run by the above-described system is released. Then, when the driver operates to resume the cruise speed run by the system, a resume operation of the system causes the vehicle to run at the stored vehicle speed.

Furthermore, a method has been proposed to provide more precise cruise control over the vehicle speed by Professor Murakami of Kyushu Kogyo University such that a fuzzy estimation is applied to the above-described system in which the controlled variable is set according to respective membership functions corresponding to the control deviation, first-order difference, and second-order difference.

However, in the above-identified Japanese Patent and Utility Model application publications, the automatic vehicle cruising speed controlling systems set the controlled variable only on the basis of the arithmetically operated values derived from the vehicle speed.

In addition, in the above-described proposed method of the fuzzy estimation, a configuration (e.g., gradient) of the membership function remains the same irrespective of a running situation under actual control over the vehicle speed in the fuzzy estimation. Therefore, control accuracy is reduced when the vehicle runs on a descending or ascending slope in which control gain of the vehicle cruise controlling system needs to be increased and, on the other hand, a magnitude of overshooting of the controlled variable (an angular displacement per time between the instantaneous angular position and previous angular position of the engine throttle valve) becomes large during a light load of the engine if the gain of control is increased. At this time, comfortability of the vehicle consequently worsens.

SUMMARY OF THE INVENTION

It is, therefore, an object of the present invention to provide a system and method for automatically controlling a vehicle's speed to a desired speed, which can always activate an optimum control characteristic. Comfortability of the vehicle in which the system is mounted can be assured, without reduction of control accuracy and without occurrence of overshooting of the controlled variable.

The above-described object can be achieved by providing a system for automatically controlling a vehicle speed to a desired cruising speed, comprising: (a) first means for monitoring vehicle speed; (b) second means for setting a target cruising speed according to a vehicle driver's own decision; (c) third means for controlling a vehicular engine output according to a controlled variable set for each predetermined interval of time so that the monitored vehicle speed coincides with the target cruising speed set by the second means; (d) fourth means for storing a group of membership functions in a fuzzy estimation, each stored membership function being correctable; (e) fifth means for setting the controlled variable in the third means using one of the membership functions retrieved from the fourth means on the basis of the monitored vehicle speed and target cruising speed; and (f) sixth means for deriving a change rate of the vehicle speed on the basis of the monitored vehicle speed and correcting the membership function stored in the fourth means and used for setting the controlled vehicle by the fifth means under a predetermined condition on the basis of the monitored vehicle speed, the change rate of the monitored vehicle speed, and set controlled variable.

The above-described object can also be achieved by providing a method for automatically controlling a vehicle speed at a desired cruising speed, comprising the steps of: (a) monitoring the vehicle's speed; (b) setting a target cruising speed, according to a driver's decision; (c) providing means for storing a group of membership functions in a fussy estimation, each stored membership function being correctable; (d) setting a controlled variable using the membership functions stored in the step (c) and retrieved from the storing means on the basis of the monitored vehicle speed and target cruising speed; (e) deriving a change of the vehicle speed from the monitored vehicle speed and correcting the membership functions stored in the step (c) on the basis of an input information of the monitored vehicle speed, change rate of the vehicle speed and information on the controlled variable set in step (d); (f) controlling vehicular engine output according to the stored and corrected controlled variable in step (e) for each predetermined control period, so that the monitored vehicle speed coincides with the target cruising speed.

BRIEF DESCRIPTION OF THE DRAWINGS

FIGS. 9(A) to 9(F) are graphs representing each part of the vehicle functions during the control by means of the automatic cruising speed controlling system.

DETAILED DESCRIPTION OF THE PREFERRED EMBODIMENT

Reference will hereinafter be made to facilitate understanding of the present invention.

Figure 1:
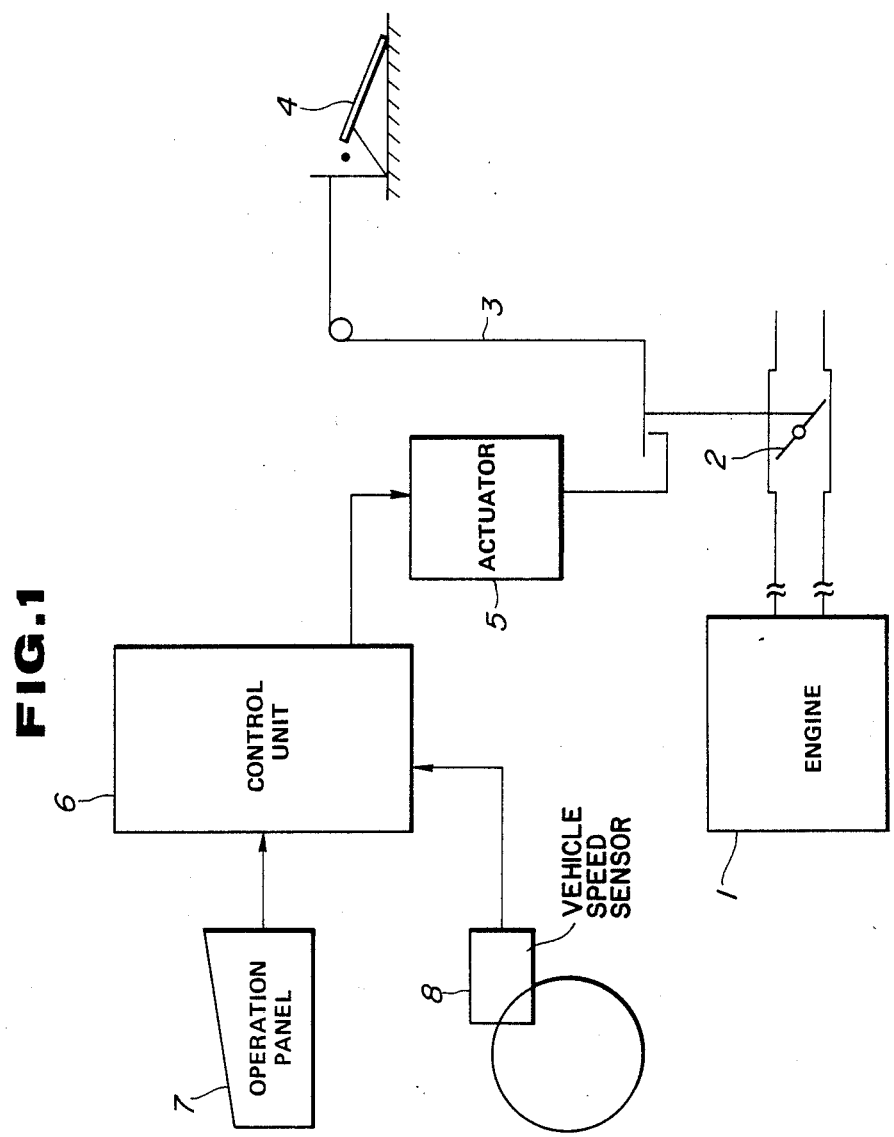
FIG. 1 is a schematic block diagram of a preferred embodiment of a system for automatically controlling a vehicle speed to a desired cruising speed according to the present invention.

FIG. 1 shows a preferred embodiment of an automatic cruising speed controlling system according to the present invention.

The same configuration as shown in FIG. 1 is exemplified by a U.S. patent application Ser. No. 143,092 filed on Jan. 12, 1988, the disclosure of which is hereby incorporated by reference.

An actuator denoted by 5 is disposed between a control unit 6 and a throttle valve 2 of an engine 1 installed in a vehicle for actuating the throttle valve through an accelerator link 3 independently of a manually operable accelerator pedal 4.

Figure 2:
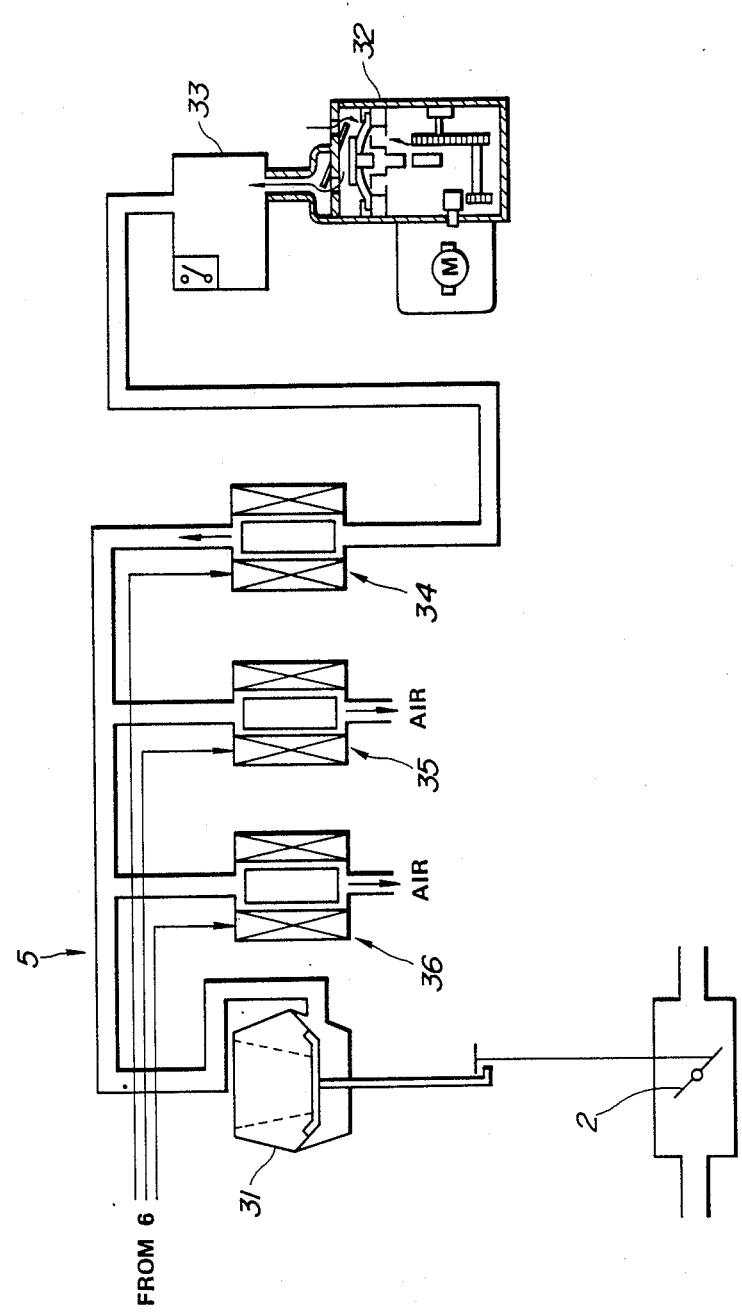
FIG. 2 is a schematic diagram of a driving section of the automatic cruising speed controlling system.

FIG. 2 shows a detailed structure of the actuator 5.

The actuator 5 includes a diaphragm 31 capable of driving the throttle valve 2. The diaphragm 31 receives a pressurized air derived by means of an electrically operated air pump 32 from an air tank 33 via a supply valve 35. An air valve 34 and release valve 36 are installed for opening the diaphragm 31 to air downstream of supply valve 34.

It is noted that, while not operating, or when there is no automatic cruising speed control in operation, supply valve 34 is closed with the air valve 35 and release valve 36 open, so that the internal face of the diaphragm 31 is under the atomspheric pressure and the diaphragm 31 is not operated. In the automatic cruising speed control mode,. the release valve 36 is closed. The opening or closing of the supply valve 34 and air valve 35 causes the control of the air pressure applied to the inner part of the diaphragm 31. Thus, the opening angle of the throttle valve 2 is controlled.

In FIG. 1, the control unit 6 includes a microcomputer having a CPU, ROM. RAM, and I/O ports.

The control unit 6 carries out an arithmetical operation, to be described later, and controls the opening and closing of the supply valve 34, air valve 35 and release vale 36 in the way as described later.

The control unit 6 receives an input command from an operation panel 7 including a set switch, an acceleration (accelerate) switch and the resume switch. The function of these switches are disclosed in the U.S. patent applications Ser. No. 043,532 filed on Apr. 28, 1987 and Ser. No. 043,268 filed on Apr. 28, 1987, the disclosures of which are hereby incorporated by reference.

The control unit 6 receives a vehicle speed information derived from a vehicle speed sensor 8.

FIGS. 4(A) and 4(B) integrally show a vehicle speed controlling routine executed in the control unit 6 through the actuator 5.

Figure 3A:
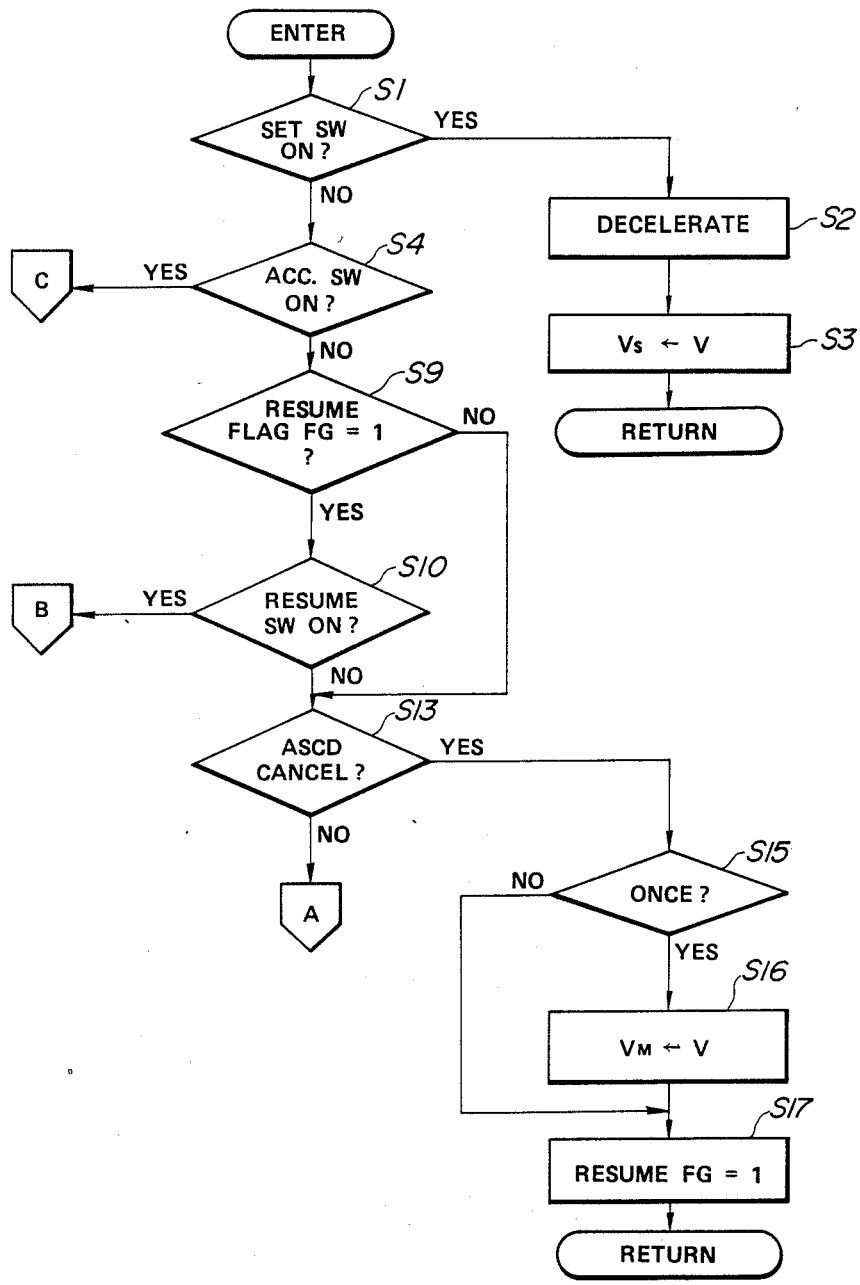
FIGS. 3(A) and 3(B) are integrally an operational flowchart of a vehicle speed control routine executed in the automatic cruising speed controlling system shown in FIG. 1.
Figure 3B:
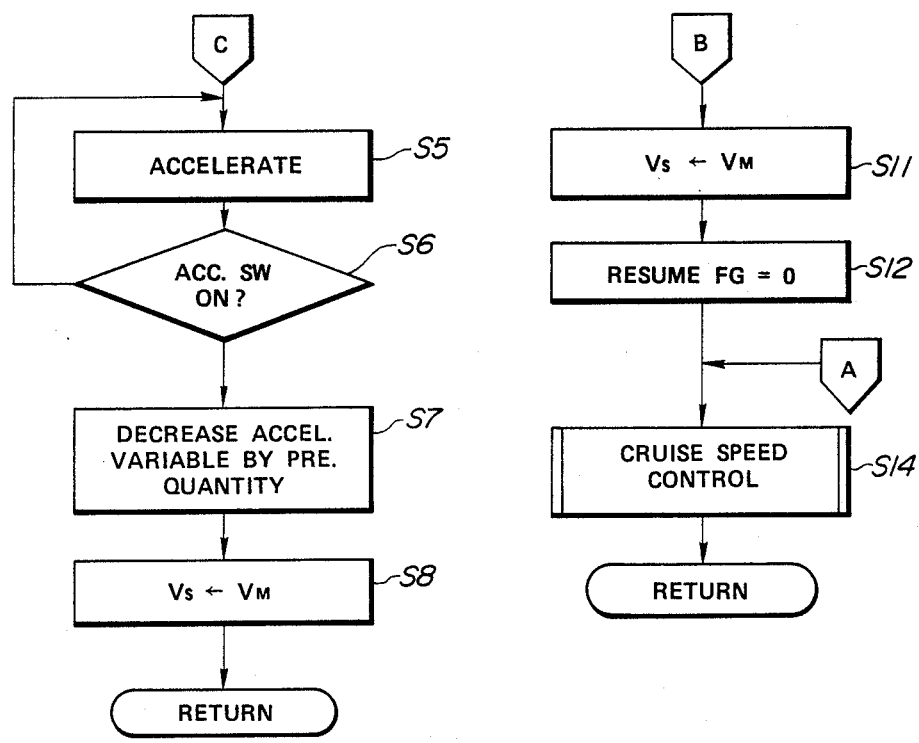

The control routine shown in FIGS. 3(A) and 3(B) is executed for each predetermined control period.

In a step S1, the control unit 6 determines whether the set switch 1 on the operation panel 7 is turned on. If the set switch 1 is turned on (yes), the routine goes to a step S2 in which the control unit 6 actuates the air valve 35 to open for a predetermined period of time to carry out the deceleration control of the vehicle. In a step S3, the control unit 6 sets the instantaneous vehicle speed V read from the vehicle speed sensor 8 as a target vehicle speed. While the set switch is continues to be turned on, the above-described operation is repeated so that the vehicle speed is reduced.

When the set switch is released, the routine goes to a step S4 in which the control unit 6 determines whether accelerate switch (acceleration) is turned on.

If the accelerate switch is turned on (yes), the routine goes to a step S5 in which the control unit 6 actuates the supply valve 34 to open for a predetermined period of time to control the acceleration of the vehicle. Then, the routine goes to a step S6 in which the control unit 6 determines whether the accelerate switch is again turned on. If yes, the routine returns to the step S5 to carry out the acceleration control repeatedly to execute the acceleration control. When the accelerate switch is released, the routine goes to a step S7 in which the supply valve 34 is closed and the air valve 35 is open for a predetermined period of time so that the throttle valve 2 is returned slightly toward the close direction, to suppress over-acceleration of the vehicle caused by overshooting. Thereafter, the routine goes to a step S8 in which the instantaneous vehicle speed V is set as the target vehicle speed.

In this way, the vehicle speed reaches the target vehicle speed when the set or acceleration switch is released at a time when the target vehicle speed is reached with the deceleration through the turning on (depression) of the set switch or acceleration through the turning on (depression) of the accelerate switch. The vehicle speed at that time is set as the target vehicle speed Vs for the cruise run of the vehicle.

Next, the routine goes to a step S9 in which the control unit 6 determines whether a resume flag FG is set. The resume flag FG is set when a previous cruising run is completed and reset when the resume switch is turned on (depressed). When the resume flag is set, the vehicle speed at the time of the previous cruising run is stored. When the resume switch is depressed, the control unit resumes the vehicle speed control so that the vehicle speed reaches the stored vehicle speed.

When the resume flag is set in the step S9, the routine goes to step S10, in which the control unit 6 determines whether the resume switch is depressed. If the resume switch is turned on (depressed), the routine goes to a step S11 in which the vehicle speed $V_M$ stored at the time when the previous cruising run completed is set as the target vehicle speed $V_S$. In step S12, the resume flag FG is reset. Thereafter, the routine goes to a step S14 in which the cruise running control is resumed.

Then, if the state described above continues, the determination at the step S9 is No and the routine goes to a step S13 in which the control unit 6 determines whether the cruise running control (so called, ASCD) is cancelled (including during operation or during the cancel). Unless otherwise cancelled, the routine goes to a step S14, in which the vehicle speed $V_M$ is set as the target vehicle speed.

On the other hand, if the resume switch is not depressed, the determination of the step S10 gives No, and the routine goes to the step S13. During the cruise speed control, the routine goes to a step S14 in which the cruise running control is continued at the target vehicle speed Vs set in the step S3 or S8.

When the control unit 6 determines whether the cruise running control (ASCD) is cancelled in a step S13, the routine goes to a step S15. In the step S15, the control unit 6 determines whether the number of times the cancellation is carried out; i.e. once or not. If the the cancellation is carried out once, the routine goes to a step S16, in which the control unit 6 stores the vehicle speed V at that time as $V_M$. In a step S15, the resume flag FG is set. If the number of times the cancellation is carried out is twice or more, the routine goes to a step S17. It is noted that the vehicle speed $V_M$ stored in the step S16 is set as the target vehicle speed when the resume switch is depressed at the next time.

In this way, the target vehicle speed in the case where the cruise running control is carried out in the step S14 is set according to the intention of a driver.

Figure 4:
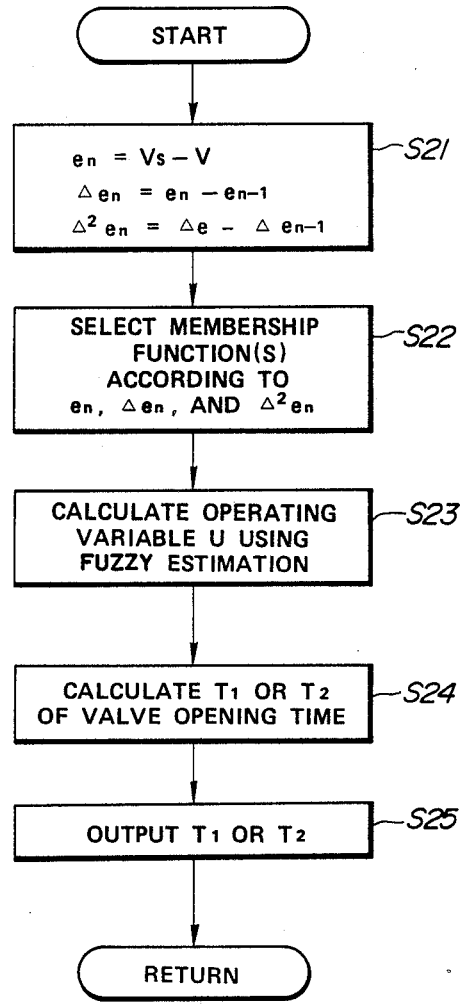
FIG. 4 is an operational flowchart of a cruising speed control routine executed in the automatic cruising speed controlling system shown in FIG. 1.

FIG. 4 shows an operational flowchart of the cruise running control utilizing a fuzzy estimation carried out in the step S14.

In a step S21, the control unit 6 calculates a control deviation $e_n$ ($=Vs-V$), a first-order differential value $\Delta e_n(=e_n-e_{n-1})$, and a second-order differential value $\Delta^2 e_n(\Delta e_n - \Delta e_{n-1})$.

In a step S22, the control unit 6 sets an optimum membership function selected from among the membership function groups stored in predetermined memory locations of the control unit 6 when the controlled variable is set from the fuzzy estimation according to the calculated control deviation $e_n$, the first-order differential value $\Delta e_n$, and second-order differential value $\Delta^2 e_n$.

Figure 5A:
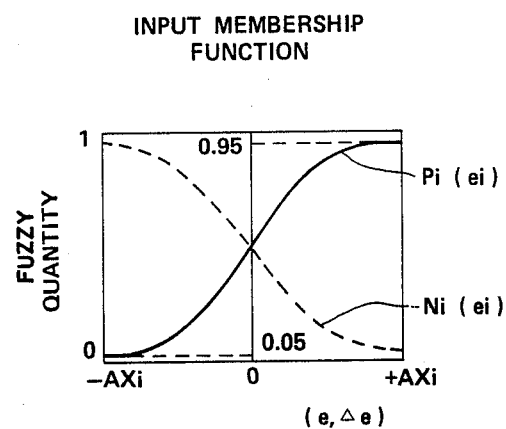
FIGS. 5(A) and 5(B) are graphs representing input and output membership functions stored in a memory.
Figure 5B:
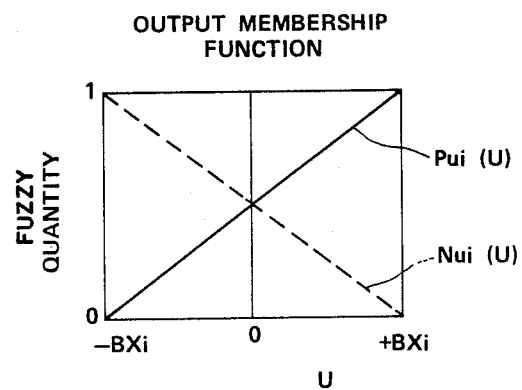

FIGS. 5(A) and 5(B) specifically show input and output membership functions.

In addresses of the predetermined memory locations (RAM) specified by the control deviation $e_n$, first-order deviation value $\Delta e_n$, and second-order differential value $\Delta^2 e_n$, the numerical tables shown in FIGS. 5(A) and 5(B) are stored corresponding to the membership functions shown in FIGS. 5(A) and 5(B). The control unit (CPU) 6 retrieves one of the respective numerical tables according to the address specification.

In a step S23, the control unit 6 calculates an operating variable U of an actuator (supply valve 34 or air valve 35) on the basis of a fuzzy estimation using the selected input and output membership functions in the step S22.

In a step S24, the valve opening time of duration T1 of the supply valve 34 or the valve opening time of duration T2 of the air valve 35 is set depending on a positive or negative operating variable U and whether either of the air valve 35 or supply valve 34 is being operated.

In a step S25, a control signal is outputted to either the supply valve 34 or air valve 35 so that either of the valves is open for the time of duration T1 or T2 set in the step S24.

Next, the fuzzy estimation will be described below with reference to FIGS. 5(A) and 5(B).

The fuzzy estimation is exemplified by the U.S. patent application Ser. No. 143,092 filed on Jan. 12, 1988, the disclosure of which is hereby incorporated by reference.

An input membership function which emprically shows a certainty (fuzzy quantity) of a proposition $I_i$ ($i=1$ to 3) that an operating variable U should be positive when each value for the control deviation $e_n$ (hereinafter $e_1$), the first-order differential value $\Delta e_n$, the second-order differential value $\Delta e^2_n$ (hereinafter $e_3$) is positive, e.g., set in the following equation. (Refer to a solid line of FIG. 5(A)).

$$P_i(e_i) = 1/\pi \tan^{-1}(Cie_i) + 0.5 \qquad (1)$$

Another input membership function which emprically shows a certainty (fuzzy quantity) of a proposition $II_i$ ($i=1$ to 3) that the operating variable U should be negative when each value of $e_1$, $e_2$, and $e_3$ is negative. (Refer to a broken line of FIG. 5(A)).

$$N_i(e_i) = 1/\pi \tan^{-1}(-Cie_i) + 0.5 \qquad (2)$$

On the other hand, an output membership function which shows the correspondence to the operating variable U and to the certainty that the operating variable U should be positive corresponding to the proposition $I_i$ is, e.g., set in the following equation. (Refer to a broken line of FIG. 5(B)).

$$Pu_i(U) = -diU + 0.5 \qquad (3)$$

Another output membership function corresponding to the proposition $I_i$ is, e.g., set in the following equation. (Refer to a broken line of FIG. 5(B)).

$$N^{ui}(U) = -diU + 0.5 \qquad (4)$$

Suppose that a truth value of a value of the output membership function for a value of the input membership function is $\gamma$. the following equations are established for the propositions $I_i$ and $II_i$.

$$P_i(e_i) + \gamma - 1 = Pu_i(U) \qquad (5)$$

$$N_i(e_i) + \gamma - 1 = Nu_i(U) \qquad (6)$$

As greater the truth value $\gamma$ becomes, the greater the effect of control for the corresponding proposition becomes.

Figure 6:
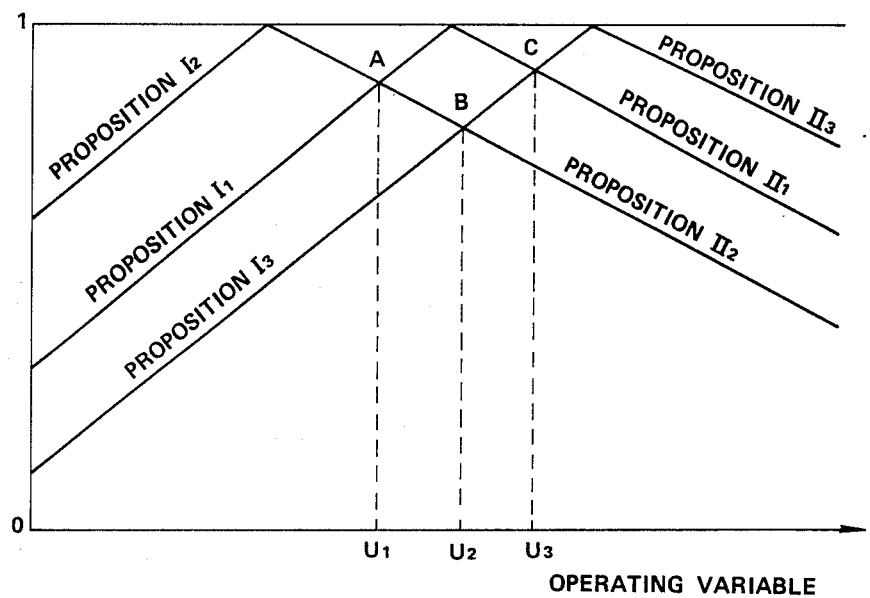
FIG. 6 is a graph used to set an operating variable through a fuzzy estimation.

FIG. 6 shows a graph for each proposition in which the truth value of the proposition that the operating variable when the input variable is $e_i$ (known) should be U (unknown) is taken in a longitudinal axis and the operating variable is taken in a lateral axis.

As the value of $\gamma$ approaches one, the more favorable operating variable U for the preposition is represented. As a method for selecting the optimum operating variable U, each operating variable at an intersection of each graph is derived.

In FIG. 6, an intersection A satisfies with the exact same truth value $\gamma$ for propositions $I_1$ and $II_2$. That is to say, the optimum operating variable $U_1$ is provided when the control deviation $e_1$ and first-order differential value $e_2$ are considered.

Similarly, an intersection B denotes the optimum value $U_2$ based on the first-order differential value $e_1$ and second-order differential value $e_2$ and an intersection C denotes the optimum value $U_3$ based on the control deviation and second-order differential value.

The three operating variables $U_1$, $U_2$, and $U_3$ thus derived are candidates the optimum operating variable. The cruising system determines one of the operating variables to be outputted therefrom, from among the three operating variables. The method of determination includes an average value of the three operating variables, a weighted mean value thereof, a mode of sets for each value, and a median. However, in the preferred embodiment, an intermediate value of the three operating variables ($U_2$ in FIG. 6) is selected.

It is noted that although the above-described fuzzy estimation is referred to as an indirect method, a direct method may be used. The direct method is a method in which the fuzzy quantity derived by the input membership function is directly multiplied to the output membership function in which the output quantity is set, for the input quantity to set the output quantity.

Figure 7:
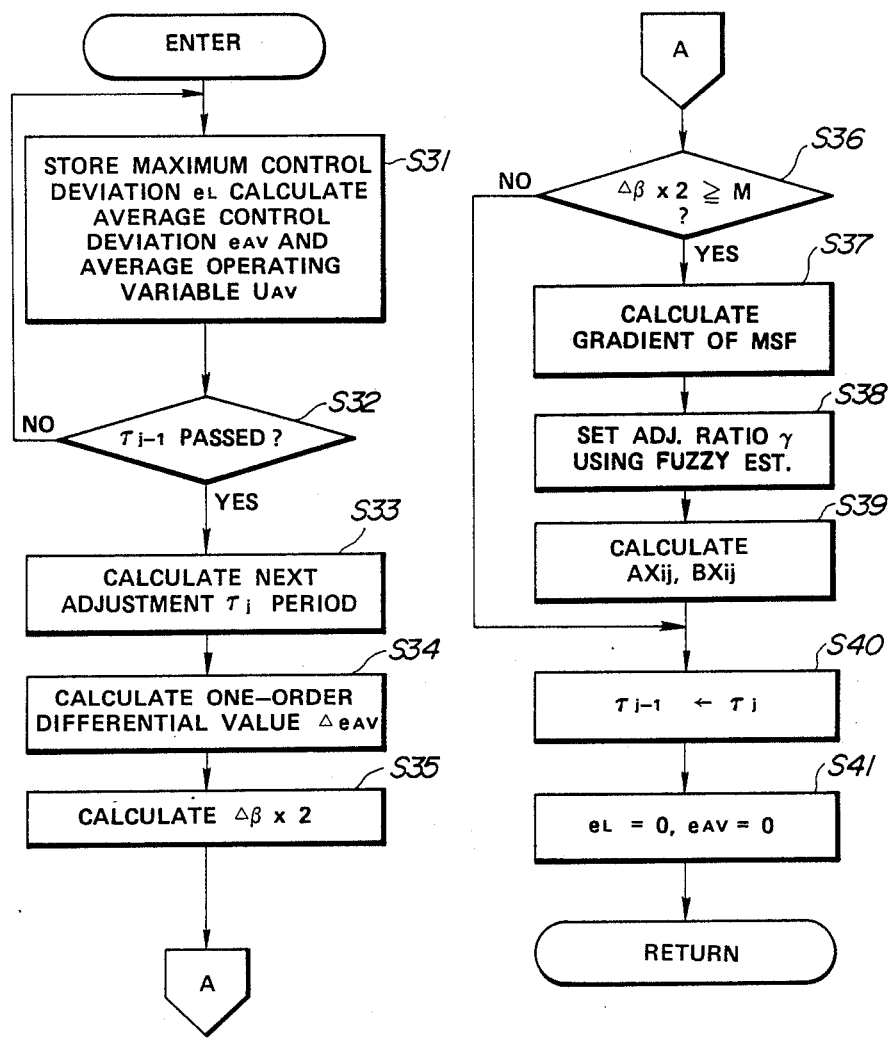
FIG. 7 is an operational flowchart representing a correction routine through which parameters of the membership functions are corrected.

FIG. 7 shows a flowchart of a routine for correcting the respective membership functions stored in the memory on the basis of the detected vehicle speed, the change state of the vehicle speed, and information of the set controlled variable.

In a step S31, the control unit 6 stores a maximum value (maximum control deviation) $e_L$ from among the control deviations e calculated for each control period in an adjustment period $\tau_{j-1}$ of the present parameter and calculates and stores the average value $U_{AV}$ for each control period of the operating variable U derived in the step S23 and the average value (average control deviation) $e_{AV}$ of the control deviation e for each predetermined control period.

In the step S32, the control unit 6 determines whether the above-described adjustment period $\tau_{j-1}$ has elapsed. If the period $\tau_{j-1}$ has elapsed, the routine goes to a step S33 in which the control unit 6 calculates a new adjustment period $\tau_j$ in the following equation.

$$\tau_j = [1 - K_1\{K_2 \times |e_{L(j-1)}| + K_3 \times BX1_{(j-1)} + K_4 \times BX2_{(j-1)} + K_5 \times BX3_{(j-1)} + K_6/AX1_{(j-1)} + K_7/AX2_{(j-1)}\}] \times \tau_{STD} \quad (7)$$

In equation (7), $BXi_{(j-1)}$ and $AXi_{(j-1)}$ (i=1, 2, 3) denote the parameter of the output membership function, parameter of the input membership function, both in the adjustment period $\tau_{j-1}$ at one previous adjustment period before the present adjustment period, and $K_1$ to $K_7$ denote constants.

The parameter $AX_i$ of the input membership functions is set as $AX_i = 2\pi/Ci$ for Ci shown in the equations (1) and (2).

The parameter $BX_i$ for the output membership functions is set as $BX_i = \frac{1}{2} di$ for di shown in the equations of (3) and (4).

In this case, both $AX_i$ and $BX_i$ correspond to input quantity and output quantity, each providing the maximum value of the fuzzy quantity for the input and output membership functions, as shown in FIGS. 5(A) and As the $AX_i$ (absolute value) becomes large, the fuzzy quantity, i.e., gain for the same input quantity becomes smaller. As $BX_i$ (absolute value) becomes large, the gain becomes large.

In the equation (7), $\tau_{STD}$ denotes a reference adjustment period (for example, about three minutes).

The adjustment period $\tau$ determined in equation (7) is variably set so as to fall between 0.2 and 6 times a time constant of the vehicle (about 30 seconds to 50 seconds). Specifically, in a case where the control characteristic is favorable, the adjustment period $\tau$ is maintained longer so as not to change the parameter due to a slight external disturbance. In a case where an abrupt increase of the control deviation occurs, the adjustment period $\tau$ is shortened to change the parameter speedily so that the control deviation is corrected (a speedy approach to the target vehicle speed).

In steps S33 to S35, the adjustment quantities of the parameters $AX_i$ and $BX_i$ of the membership functions on the basis of various data derived within the present adjustment period $\tau_{j-1}$ are set on the basis of the fuzzy estimation.

In the step S34, the control unit 6 calculates the present average control deviation $e_{AVj}$ calculated in the step S3i upon the elapse of the adjustment period $\tau_{j-1}$ and the first-order differential value $\Delta e_{AV}$ which is a difference between the present average control deviation $e_{AVj}$ at the instantaneous adjustment period and average control deviation $e_{AVj-1}$ at the previous adjustment period.

A configuration (gradient) of the membership function (adjustment MSF) used when the parameters $AX_i$ and $BX_i$ are set on the basis of the fuzzy estimation are set so as to vary according to the change state of the parameter BX2.

A basic characteristic of the membership function (abbreviated as MSF) for adjusting the parameter on the basis of the relationship between the gain and parameters $AX_i$ and $BX_i$ will be described as a linguisic tuning rule (abbreviated as LTR).

(i) as LTR, placing emphasize on the accuracy.

If $e_{AV}$ and $\Delta e_{AV}$ (both absolute values) are large respectively, the values of $AX_i$ are decreased and those of $BX_i$ are increased since the gain needs to be enlarged and control accuracy needs to be increased. Hence, the characteristic of the input MSF for both parameters belongs to type II of FIG. 8 and the characteristic of the output MSF for the former parameter belongs to type III and for the latter parameter belongs to type IV.

(ii) as LTR, placing emphasize on the comfortability.

When both $e_{AV}$ and $\Delta e_{AV}$ are respectively small, the control state is stable. Therefore, in this case, the control gain needs to be reduced and the comfortability is improved to control variations. To reduce the gain it is necessary to increase the values of $AX_i$ and to decrease those of $BX_i$. Hence, the characteristic of the input MSF for both parameters belongs to type I in FIG. 8 and the characteristic of the output membership function for the former parameter belongs to type IV and that for the latter parameter belongs to type III.

(iii) as LTR for the operating variable U

As the average operating variable $U_{AV}$ is large, the values of $BX_i$ are reduced to reduce the average operating variable $U_{AV}$. If the average operating variable $U_{AV}$ is reduced, the values of $BX_i$ are increased to increase the values of $BX_i$. The input membership function (MSF) belongs to type I and the output membership function belongs to type III.

(iii) as LTR for the operating variable U.

As the average operating variable $U_{AV}$ is increased, values of $BX_i$ are reduced to reduce the average operating variable $U_{AV}$. As the average operating variable $U_{AV}$ is reduced, the values of $BX_i$ are enlarged to increase the average operating variable $U_{AV}$. Hence, the input MSF for the former parameter belongs to type I and the output MSF for the latter parameter belongs to type IV.

Figure 8:
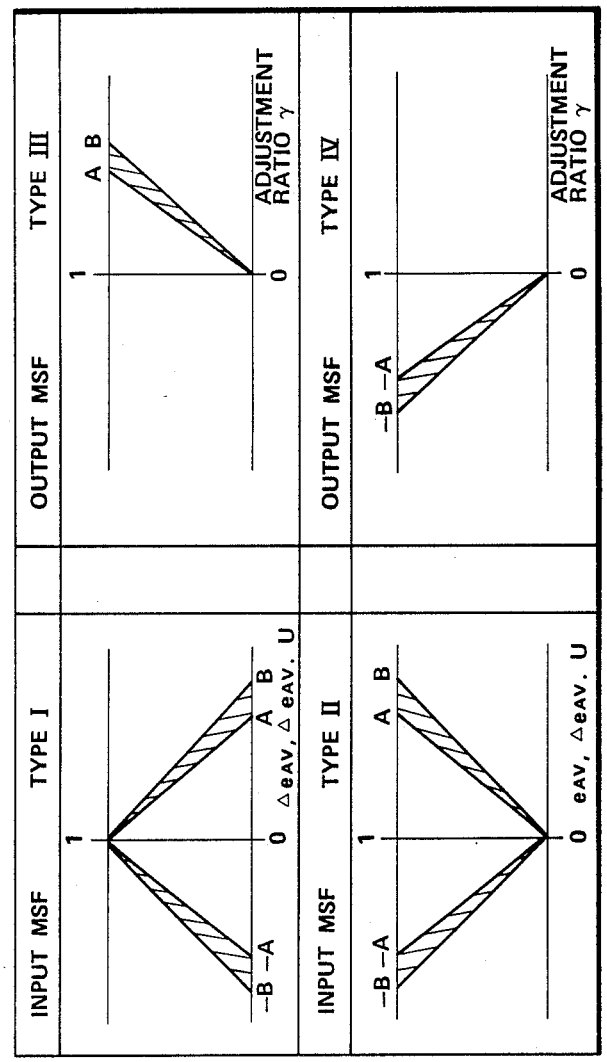
FIG. 8 is graphs representing types of respective membership functions to correct the parameters.

The gradient of the MSF is variably set using the fuzzy estimation in ranges denoted by the hatched parts for the respective types of FIG. 8 with a fuzzy characteristic for each MSF itself in the preferred embodiment.

For each parameter adjusted for each adjustment period $\tau$, i.e., $AX_i(i=1,2)$ and $BX_i(i=1$ to 3), the data for 10 control periods are stored including the latest period.

When the gradient of the above-described MSF is set, an evaluation function $\Delta\beta x_2$ is used which is derived on the basis of the data of the parameter BX2 when the gradient of the above-described MSF is set.

The evaluation function $\Delta\beta x_2$ is calculated in the step S35.

A change rate $\Delta BX2_k$ of the parameter BX2 for each control period is calculated.

$$\Delta BX2_k = BX2_{k+1} - BX2_k \ (k=1, 2, \ldots 9) \tag{8}$$

The evaluation function $\Delta\beta x_2$ for a series of $\Delta BX2_k$ in the above-described equation (8) is calculated in the following equation.

$$\Delta\beta x_2 = \sum_{k=0}^{9} (k+1)|\Delta BX2_k| / \sum_{1}^{10} k \tag{9}$$

The evaluation function $\Delta\beta x_2$ is a weight mean of the change rate $\Delta BX2_k$ and serves as an index for indicating convergence state of the parameter BX2.

In details, when $\Delta\beta x_2$ is large, a degree of convergence in the parameter BX2 becomes worse. To enlarge adjustment quantities of the parameters $AX_i$ and $BX_i$, a correction quantity of the gradient of each MSF is set to enlarge the adjustment quantities of the parameters $AX_i$ and $BX_i$.

In addition, as $\Delta\beta x_2$ is small, the degree of convergence is preferable and the control state is stable. Therefore, with the correction quantity of the gradient of the MSF being reduced, correction of the gradient is stopped when $\Delta\beta x_2$ is less than a predetermined value M.

In the step S36, the control unit 6 determines whether $\Delta\beta x_2$ is above a predetermined value. If $\Delta\beta x_2$ is less than the predetermined value, the routine goes to a step S40 without correction of the gradient. If $\Delta\beta x_2$ is above the predetermined value, the routine goes to the step S37.

In the step S37, the gradient of the MSF is calculated in the following equation using the above-described evaluation function $\Delta\beta x_2$ and A and B shown in each type in FIG. 8.

$$\text{Gradient of } MSF = \tag{10}$$

$$1/A - (1/A - 1/B) \times \left| \frac{\Delta\beta X_2/}{\sum_{k=0}^{9}(k+1)(300-20)/\sum^{10} K} \right|$$

A term in the inner part of the absolute value in the equation (10) is a normalization of the evaluation function $\Delta\beta x_2$ derived in the equation (9).

A maximum range of change in $\Delta\beta X_2$ is from 100 to 20. The item of the absolute value. i.e., the second item in the equation (10) gives a numerical value from 0 to 1 with the equation (9) taken into account.

The MSFs corresponding to all LTR (totally 26) are determined by setting their gradients and thereafter the routine goes to the step S38, the adjustment ratios $\gamma$ of the parameters $AX_i$ and $BX_i$ are calculated on the basis of the fuzzy quantity using these MSFs.

Specifically, the fuzzy quantities are derived from the input MSFs corresponding to the input data of $e_{AV}$, $\Delta e_{AV}$, and $U_{AV}$, and center of weights of the respective adjustment ratios $\gamma$ derived from the respectively corresponding output MSFs are taken to set a final adjustment ratio $\gamma$. This is called the direct method of the fuzzy estimation.

In a step S39, the parameters $AXi_j$ and $BXi_j$ are calculated which have been adjusted in the following equation using the final adjustment ratio $\gamma$.

$$AXi_j = AXi_{(j-1)}(1+\gamma)$$

$$BXi_j = BXi_{(j-1)}(1+\gamma)$$

Then, the configurations of the input and output membership functions are corrected when the calculations of the operating variable U by means of the parameters $AXi_j$ and $BXi_j$ adjusted in the way as described above and used in the fuzzy estimation. Thus, the cruising run characteristic having the high response accuracy during the run on slopes is derived. In addition, during a run on flat roads, the stability and good comfortability are improved.

As described above, since the adjustment period $\tau$ is variably set according to driving conditions, the above-described effect can be promoted.

In a step S40, the adjustment period $\tau_j$, calculated in the step S33, is replaced with $\tau_{j-1}$ for the subsequent use.

In a step S41, the maximum control deviation $e_L$ and average control deviation $e_{AV}$ are reset.

FIGS. 9(A) to 9(F) show each characteristic graphs of each essential part of the automatic cruising speed controlling system and engine in a case where the automatic cruising speed control is carried out on the basis of the above-described fuzzy estimation in the preferred embodiment.

As shown in FIGS. 9(A) to 9(F), the control deviation is reduced about by 30% and the change quantity of the opening angle of the throttle valve 2 which is an index for the comfortability is reduced about by 30%. Therefore, the stable running performance of the vehicle e can be achieved.

As described hereinabove, since in the system and method for automatically controlling the vehicle speed at the desired cruising speed the controlled variables are set on the basis of the fuzzy estimation and the membership functions used in the fuzzy estimation are sequentially corrected according to set controlled variables, vehicle speed, and change rate of the vehicle speed, a favorable response characteristic at the time of run on slopes can be assured and the comfortability can be improved during the run on flat roads. Consequently, the optimum control of the cruising speed can be achieved.

It will fully be appreciated from the foregoing description by those skilled in the art that the foregoing description is made in terms of the preferred embodiment and various changes and modifications are made without departing the scope of the present invention which is to be defined by the appended claims.

What is claimed is:

1. A system for automatically controlling the speed of a vehicle at a target cruising speed, comprising:

(a) first means for monitoring the speed of the vehicle;
(b) second means for setting the target cruising speed at which the vehicle cruises during a run of the vehicle according to a vehicle driver's decision;
(c) third means for controlling the vehicular engine output according to a controlled variable set for each predetermined interval of time, so that the monitored vehicle speed coincides with the target cruising speed set by the second means;
(d) fourth means for storing a group of input/output membership functions for deriving the controlled variable in a fuzzy estimation, each stored membership function being correctable;
(e) fifth means for setting the controlled variable in the third means, using one of the membership functions retrieved from the fourth means on the basis of the monitored vehicle speed and the target cruising speed; and
(f) sixth means for deriving a change rate of the vehicle speed on the basis of the monitored vehicle speed and correcting any one or more of the membership functions stored in the fourth means and used for setting the controlled vehicle by the fifth means under a predetermined condition on the basis of the monitored vehicle speed and said set controlled variable.

2. A system as set forth in claim 1, further including: (a) seventh means for deriving an optimum operating variable through the fuzzy estimation using the membership function stored in the fourth means and corrected by the sixth means on the basis of the monitored vehicle speed and the change rate of the vehicle speed; and (b) eighth means for setting the controlled variable on the basis of a value of the optimum operating variable derived by the seventh means and the output of the third means.

3. A system as set forth in claim 2, further including: (a) ninth means for calculating a control deviation $e_n$ from the vehicle speed and target cruising speed, a first-order differential value $e_2$, and a second-order differential value $e_3$; (b) tenth means for selecting and setting the membership function stored in the fourth means and corrected by the sixth means according to the calculated control deviation $e_1$, first-order differential value $e_2$, and second-order differential value $e_3$; and (c) eleventh means for calculating the optimum operating variable through the fuzzy estimation using the selected membership function from the tenth means.

4. A system as set forth in claim 3, wherein the tenth means sets a first input membership function which emprically shows the certainty (fuzzy quantity) of a first proposition that the optimal operating variable should be positive when each value of the control deviation $e_1$, the first-order differential value $e_2$, and second-order differential value $e_3$ in a first equation are as follows:

$$P_i(e_i) = 1/\pi \tan^{-1}(C_i e_i) + 0.5$$

where i represents an integer and C represents an intersection.

5. A system as set forth in claim 4, wherein the tenth means sets a second input membership function which emprically shows a certainty fuzzy quantity) of a second proposition that the optimal operating variable should be negative when each value of the control deviation $e_1$, the first-order differential value $e_2$, and the second-order differential value $e_3$ in a second equation are as follows:

$$N_i(e_i) = 1/\pi \tan^{-1}(-C_i e_i) + 0.5$$

6. A system as set forth in claim 5, wherein the tenth means sets a first output membership function which shows a correspondence of the optimal operating variable to the certainty of the first proposition that the operating variable should be positive a third equation as follows:

$$Pu_i(U) = diU + 0.5$$

7. A system as set forth in claim 6, wherein the tenth means sets a second output membership function which shows a correspondence of the optimal operating variable to the certainty of the second proposition that the operating variable should be negative in a fourth equation as follows:

$$Nu_i(U) = -diU + 0.5$$

8. A system as set forth in claim 7, wherein the eleventh means calculates the optimum operating variable in the fifth and sixth equations as follows:

$$P_i(e_i) + \gamma - 1 = Pu_i(U)$$

$$N_i(e_i) + \gamma - 1 = Nu_i(U),$$

wherein $\gamma$ denotes a truth value taken from values of output membership functions for the input membership functions and $e_i$ (i=1, 2, 3) denotes one of the control deviation, first-order differential value, and second-order differential value, said eleventh means makes a graph in which the truth value $\gamma$ is taken as a longitudinal axis and the optimal operating variable is taken as a lateral axis, derives an intersection of each graph which is represented by each candidate of the optimum operating variable, and derives the optimum operating variable from among the candidates.

9. A system as set forth in claim 8, wherein the eleventh means derives the optimum operating variable from one of the candidates whose value is intermediate between the maximum and minimum values of the candidates.

10. A system as set forth in claim 8, wherein the eleventh means derives the optimum operating variable from an average value of the candidates.

11. A system as set forth in claim 8, wherein the eleventh means derives the optimum operating variable from a weight mean value of the candidates.

12. A system as set forth in claim 8, wherein the eleventh means derives the optimum operating variable from each candidate.

13. A system as set forth in claim 8, further including:
(a) twelfth means for deriving and storing a maximum control deviation $e_L$ from among each of the control deviations e calculated by the ninth means for each control period within an instantaneous adjustment period of parameters in the membership functions, and average control deviation $1_{AV}$ of each of the control deviations e for each of the control periods with the same adjustment period, and an average operating variable $U_{AV}$ of each of the optimal operating variables derived by the seventh means for each control period within the same adjustment period;

(b) thirteenth means for deriving a new adjustment period $\tau_i$ as follows:

$$\tau_i = [a - K_1\{K_2 \times |eL(j-1)| + K_3 \times BX1_{(j-1)} + K_4 \times BX2_{(j-1)} + K_5 \times BX3_{(j-1)} + K_6/AX1_{(j-1)} + K_7/AX2_{(j-1)}\}] \times \tau_{STD}$$

, wherein $AX_{i(j-1)}$ and $BX_{i(j-1)}$ each denote a parameter of the input membership functions (i=1, 2, 3), and $K_1$ to $K_7$ denote constants, both said parameters being derived at a previous adjustment period $\tau_{j-1}$, $AX_i$ being set as $AX_i = 2\pi/C_i$ in the first and second equations, $BX_i$ being set as $BX_i = \frac{1}{2}d_i$, and $\tau_{STD}$ denoting a reference adjustment period;

(c) fourteenth means for calculating a first-order differential value $\Delta e_{Av}$ indicating a difference between an instantaneous average control deviation $e_{AVj}$ and average control deviation $e_{Av}$ at the previous adjustment period $\tau_{j-1}$; and (d) fifteenth means for variably setting a gradient of an adjustment membership function used for setting adjustment quantities of $AX_i$ and $BX_i$ through the fuzzy estimation according to a changed state.

14. A system as set forth in claim 13, further including:

(a) sixteenth means for calculating a change rate $\Delta BX_k$ of the parameter BX2 for each control period as follows:

$$BX_k = BX2_{k+1} - BX2_k \; (k=1, 2, \text{---}9);$$

(b) seventeenth means for calculating an evaluation function $\Delta\beta_{x2}$ for a series of $\Delta BX2_k$ derived by the sixteenth means using the following equation:

$$\Delta\beta_{x2} = \sum_{k=0}^{9} (k+1)|\Delta BX2_k| / \sum_{1}^{10} K;$$

(c) eighteenth means for determining whether the value of the evaluation function $\Delta\beta_{x2}$ exceeds a predetermined value M;

(d) nineteenth means for calculating the gradient of the adjustment membership function when the eighteenth means determines that $\Delta\beta_{x2} > M$ using the following equation:

gradient of MSF (adjustment membership function) = $1/A - (1/A - -1/B) \times |\Delta\beta_{x2}/\Sigma(k-1)(300-20)/\Sigma K|$ , wherein A and B are gradients of types of basic characteristics of the adjustment membership functions using linguistic tuning rules (LTR);

(e) twentieth means for calculating an adjustment rate $\gamma$ of each of $AX_i$ and $BX_i$;

(f) twenty first means for calculating the parameters of $AX_{ij}$ and $BX_{ij}$ using the adjustment rate $\gamma$ as follows:

$$AX_{ij} = AX_{i(j-1)}(1+\gamma)$$

$$BX_{ij} = BX_{i(j-1)}(1+\gamma); \text{ and}$$

(g) twenty second means for correcting gradients of the input and output membership functions used in the fuzzy estimation for deriving the optimum operating variable by the seventh means according to the adjusted parameters $AX_{ij}$ and $BX_{ij}$ derived by the twenty first means.

15. A system as set forth in claim 14, wherein the twentieth means stops the calculation of the gradient when the eighteenth means determines that $\Delta\beta_{x2} < M$.

16. A system as set forth in claim 14, which further comprises a twenty third means for replacing the instantaneous adjustment period $\tau_j$ with the previous adjustment period $\tau_{j-1}$ for the subsequent use after the twenty second means corrects the gradients thereof; and twenty fourth means for resetting the maximum control deviation $e_L$ and average control deviation $e_{AV}$.

17. A system as set forth in claim 13, wherein $\tau_{STD}$ is approximately three minutes.

18. A system as set forth in claim 13, wherein the calculated adjustment period is variably set so as to fall in a range of time between 0.2 times and 6 times a time constant of a vehicle in which the system is mounted.

19. A system as set forth in claim 1, wherein the controlled variable is the operation time of the compressed air pressure in an actuator for actuating a throttle valve of the vehicular engine.

20. A method for automatically controlling the speed of a vehicle at a target cruising speed, comprising the steps of:

(a) monitoring the vehicle speed;
(b) setting a target cruising speed according to a driver's decision;
(c) providing means for storing a group of membership function in a fuzzy estimation, each stored membership function being correctable;
(d) setting a controlled variable, using the membership functions stored in the step (c) and retrieved from the storing means on the basis of the monitored vehicle speed and the target cruising speed;
(e) deriving a change of vehicle speed from the monitored vehicle speed and correcting the membership functions stored in the step (c) on the basis of input information of the monitored vehicle speed, the change rate of the vehicle speed and information on the controlled variable set in the step (d); and
(f) controlling vehicular engine output according to the stored and corrected controlled variable in step (e) for each predetermined control period so that the monitored vehicle speed coincides with the target cruising speed.

21. A method as set forth in claim 20, wherein the step (e) corrects the membership functions through the fuzzy estimation under a predetermined condition.

* * * * *